Patented Dec. 7, 1948

2,455,653

UNITED STATES PATENT OFFICE 2,455,653

DI(ALKENYL CARBONATO) AROMATIC COMPOUNDS AND POLYMERS THEREOF

James A. Bralley, Akron, and Frank B. Pope, Cuyahoga Falls, Ohio, assignors to The B. F. Goodrich Company, New York, N. Y., a corporation of New York No Drawing. Application February 21, 1945, Serial No. 579,164

11 Claims. (Cl. 260—77.5)

This invention relates to new chemical compounds, and pertains more specifically to certain unsaturated polyesters which are capable of polymerization to form non-thermoplastic polymers, and to the polymers obtained by such polymerization.

It is well-known that various unsaturated polyesters may be polymerized to form polymers of high molecular weight which are industrially useful. However, all of the materials previously known suffer from a variety of disadvantages, one of the most important of which is the fact that a relatively large shrinkage in volume occurs during the polymerization reaction. This fact, of course, makes it impracticable to use such materials as molding resins of the thermosetting variety because of the impossibility of obtaining accurate dimensions in the finished product.

We have now discovered a certain class of unsaturated polyesters which possess the property of polymerizing readily, particularly in the presence of organic peroxide catalysts, to form hard, non-thermoplastic, resinous, solid materials, and which in addition change very little in volume during the polymerization process. The materials which possess these properties are certain esters of carbonic acid. More particularly, these materials are polycarbonic esters in which two or more carbonic acid groups are attached to nuclear carbon atoms of an aromatic radical, and the carbonic acid groups are further attached by their second valences to polymerizable alkenyl radicals. That is these materials are compounds having the general structure

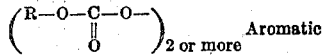

and which may therefore be called poly-alkenylcarbonato aromatic compounds, in which the alkenyl group designated by R is an alkenyl group containing a methylene group attached by a double bond to a carbon atom and the aromatic nucleus designated by Aromatic is an aromatic radical with two or more free valences (to which the R—O—CO—O— groups are attached) on nuclear carbon atoms. It is essential that at least two of the above-described alkenyl groups be present in the compound in order that it may be polymerized to a hard, non-thermoplastic material. Furthermore, it is essential that the alkenylcarbonato radicals described above be connected directly to nuclear aromatic carbon atoms in order that the resulting compound be one which is characterized by low shrinkage upon polymerization. All of the alkenylcarbonato radicals need not be directly attached to the same aromatic nucleus, but if they are attached to separate nuclei, the nuclei are joined, in a preferred embodiment of the invention, by a chain of no more than four atoms. Of these compounds, those in which the aromatic nuclei are spaced apart by no more than a single intermediate connecting atom have given excellent results as molding resins. Any additional substituent groups may be present in the aromatic nuclei in addition to the alkenylcarbonato radicals, although a preferred class of these esters consists of those which contain no substituent groups attached to the aromatic nuclei, in addition to the alkenylcarbonato groups, except hydrocarbon groups. In many cases, however, the presence of one or more halogen atoms in the aromatic ring is desirable, since it facilitates the polymerization of the compound. This effect is most pronounced when the halogen atom is in the ortho-position to the alkenylcarbonato radical; when the halogen atom is in the para-position to the alkenylcarbonato radical, it has the least effect upon polymerization of the compound, although the effect is still substantial.

These polyesters may be prepared by a variety of methods; for example, a suitable alkenol may be reacted with phosgene to form the corresponding alkenyl chloroformate as described by Schving et al., Bull. Soc. Chim. 43, 857–9 (1928). Two or more molecular proportions of the alkenyl chloroformate may then be reacted with the appropriate polyhydroxy aromatic compound with the elimination of two or more molecular proportions of hydrogen chloride, to form the desired polyester.

In many cases the polyesters may also be formed by reacting the phosgene with the desired polyhydroxy aromatic compound to form the polychloroformate followed by reacting the product with two or more molecular proportions of the desired alkenol with the elimination of two or more molecular proportions of hydrogen chloride.

A third method comprises mixing together simultaneously all three reagents, the polyhydroxy compound, the phosgene, and the alkenol in the proper molecular proportions. All of these reactions involving phosgene and the ester of chloroformic acid are best carried out at moderate temperatures in order to avoid the formation of undesirable by-products, preferably at a temperature below about 100° C., and more particularly at about 0 to 20° C. It is unnecessary to employ an excess of any of the reagents above the amount theoretically necessary for the reaction, although such an excess is not harmful.

Solvents which are relatively inert to the reactants such as acetone, ether, benzene, or the like, may be employed as the reaction medium, although in many cases no solvent at all is necessary. It has been found that the second step of the reaction, that is, the reaction between the ester of chloroformic acid and the alcohol or polyhydroxy aromatic compound is greatly accelerated by the use of a strong base, which aids in the elimination of hydrogen chloride from the reactants. Bases such as sodium hydroxide, potassium hydroxide, as well as organic materials such as pyridine, quinoline, or the like, are suitable materials for this purpose.

Of the three methods described for the preparation of our new product, best results have been obtained with the first, that is, the process in which the phosgene is reacted with the alkenol to form an alkenyl chloroformate, followed by reacting two or more molecular proportions of the chloroformate with a polyhydroxy aromatic compound. Among the alkenols which may be employed in such a process are the following: allyl alcohol, methyl vinyl carbinol, allyl carbinol, vinyl ethyl carbinol, methyl allyl carbinol, beta-allyl ethyl alcohol, beta-methyl allyl alcohol, beta-ethyl allyl alcohol, and the like. Of these, allyl alcohol and the beta-alkyl allyl alcohols, such as beta-methyl allyl alcohol, are preferred.

Typical examples of the polyhydroxy aromatic compounds which may be used to form the polyesters of this invention are the following:

Hydroquinone
Resorcinol
Catechol
Phloroglucinol
Pyrogallol
Hydroxy hydroquinone
1,2-dihydroxy-4-chlorobenzene
1,4-dihydroxy-2-chlorobenzene
1,2-dihydroxy-3,5-dichlorobenzene
1,2-dihydroxy-4-bromobenzene
1,2-dihydroxy-3-nitrobenzene
1,3-dihydroxy-2,4,6-trichlorobenzene
1,3-dihydroxy-2-benzaminobenzene
1,3-dihydroxy-2,4-dinitrosobenzene
1,3-dihydroxy-2-chloro-4,6-dibromobenzene
1,4-dihydroxy-2,3-dichlorobenzene
1,4-dihydroxy-2,6-dinitrobenzene
1,2-dihydroxy-3-methylbenzene
1,3-dihydroxy-4-methylbenzene
2,5-dihydroxy-3-chlorotoluene
5-chloro-2,3-dicyanohydroquinone
2,4-dihydroxybenzoic acid
3,5-dinitro-2,4-dihydroxybenzoic acid
5-bromo-3,4-dihydroxybenzoic acid
2,3-dihydroxyterephthalic acid
Esters of the foregoing acids
Acetaminohydroquinone
Tetrachlorohydroquinone
1,4-dihydroxy-2-benzylbenzene
1,4-dihydroxy-2-ethylbenzene
1,4-dihydroxy-2-phenylbenzene
1,3-dihydroxy-2,4-dimethylbenzene
1,4-dihydroxy-2,6-dimethyl-3,5-dichlorobenzene
1,4-dihydroxy-2-methyl-5-n-propylbenzene
1,4-dihydroxy-3-isopropyl-5-chloro-6-methylbenzene
1,2-dihydroxy-4-vinylbenzene
1,4-dihydroxy-2-propenylbenzene
1,2-dihydroxy-4-allylbenzene
1,3-dihydroxy-4-isopropenylbenzene
1,2-dihydroxy-4-propinylbenzene
1,2-dihydroxy-3,4-dichloronaphthalene
1,3-dihydroxynaphthalene
1,4-dihydroxy-2,3-dichloronaphthalene
1,5-dihydroxynaphthalene
2,7-dihydroxynaphthalene
1,4-dihydroxyanthracene
1,5-dihydroxyanthracene
1,3-dihydroxy-5-methyl-6-formaminobenzene
1,2-dihydroxy-3-methoxybenzene
Pyrogallol monoacetate
4-chloropyrogallol
1,3-dihydroxy-6-methoxybenzene
1,4-dihydroxy-2-methoxy-3-nitrobenzene
1,3-dihydroxy-5-ethoxybenzene
1,3-dihydroxy-2,6-dinitroso-5-methoxybenzene
2,3,5-trihydroxy toluene
1,3,4-trihydroxy-6-propenyl benzene
2-benzyl phloroglucinol
1,3,6-trihydroxynaphthalene
1,2,10-trihydroxyanthracene
2,2'-dihydroxydiphenyl
2,4,2',4'-tetrahydroxydiphenyl
2,2'-dihydroxy-3,3'-dinitrodiphenyl
2,4'-dihydroxydiphenyl
4,4'-dihydroxydiphenyl
4',4'-dihydroxy-3,3'-diethyldiphenyl
3-chloro-4,4'-dihydroxydiphenyl
3,5,3',5'-tetrachloro-4,4'-dihydroxydiphenyl
3,5,3',5'-tetrabromo-4,4'-dihydroxydiphenyl
2,2'-dihydroxydiphenyl ether
4,4'-dihydroxydiphenyl ether
1,2-bis-(4-hydroxyphenoxy) ethane
2,2'-dihydroxydiphenyl sulfide
4,4'-dihydroxydiphenyl sulfide
Bis-(2-hydroxynaphthyl-1) sulfide
2,5,2',5'-tetrahydroxydiphenyl sulfide
2,2'-dihydroxydiphenyl disulfide
4,4'-dihydroxydiphenyl disulfide
4,4'-dihydroxydiphenyl sulfoxide
4,4'-dihydroxydiphenyl sulfone
2,5-dihydroxydiphenyl sulfone
2,2'-dihydroxydiphenyl methane
2,4'-dihydroxydiphenyl methane
4,4'-dihydroxydiphenyl methane
4,4'-dihydroxy-3,5,3',5'-tetrachlorodiphenyl methane
4,4'-dihydroxy-2,2'-dinitrodiphenyl methane
Bis-(4-hydroxy-2,6-dimethyl-3-methoxyphenyl) methane
2,2'-dihydroxydibenzyl
4,4'-dihydroxydibenzyl
Alpha,alpha'-dichloro-4,4'-dihydroxydibenzyl
4,4'-dihydroxystilbene
4,4'-dihydroxy-3,5,3',5'-tetrabromostilbene
Bis-(4-hydroxy-3-methoxybenzyl) disulfide
1,1-bis-(4-hydroxyphenyl) ethane
1,1-bis-(4-hydroxyphenyl)-2,2-dichloroethane
1,1-bis-(2,5-dimethyl-4-hydroxyphenyl) ethane
2,2-bis-(4-hydroxyphenyl) propane
1,1-bis-(4-hydroxyphenyl) propene-1
2,3',4'-trihydroxystilbene
2,4,2'4'-tetrahydroxydibenzyl
4,4'-dihydroxytriphenylmethane
4,4',4''-trihydroxytriphenylmethane
1,1-bis-(4-hydroxyphenyl) heptane
4,4-bis-(4-hydroxyphenyl) heptane
Phenolphthalein
2,4'-dihydroxybenzophenone
1,5-dihydroxyanthraquinone
Alizarin
2,5-dihydroxyacetophenone
2,4-dihydroxypropiophenone
4,4'-dihydroxydiphenylamine
2,4-dihydroxy-2',4'-dinitrodiphenylamine
1,10-di(4-hydroxyphenyl) octadecane
2,12-di(4-hydroxyphenyl) tridecane
1,13-di(4-hydroxyphenyl) tridecane When a polyhydroxy aromatic compound containing more than two hydroxy groups is employed, as for example phloroglucinol, either two or more molecular proportions of alkenyl chloroformate may be reacted with it to form, for example, either a di- or a tri-alkenylcarbonato benzene; since compounds containing two alkenyl groups form quite satisfactory polymerization products, it is generally not necessary to attempt to introduce more than two such groups.

The unsaturated esters of this invention may readily be polymerized by any of the methods commonly used for the polymerization of unsaturated organic materials. Any of the usual catalysts such as per-compounds, actinic light, etc., may be used to accelerate the polymerization process. Excellent results have been obtained by using as a catalyst an organic peroxide such as diacetyl peroxide, acetyl benzoyl peroxide, dibenzoyl peroxide, dicaprylyl peroxide, di-o-chlorobenzoyl peroxide, ditoluyl peroxide, and the like. Although the polymerization may be carried out in solution or in aqueous emulsion, it is preferred, when the material is used as a molding compound, to carry out the polymerization merely by dissolving a suitable amount of catalyst (from 0.05 to about 5% by weight or more) in the monomeric polyester, placing the material in a mold, and allowing it to remain there until polymerization is complete. The reaction may be accelerated, of course, by heating the mixture moderately, that is, to a temperature below about 150° C., preferably to a temperature of 60° to 100° C. It has been found that the polymerization reaction tends to be inhibited by the presence of atmospheric oxygen, and for that reason it is preferred to carry out the polymerization in a closed container, from which substantially all of the atmospheric oxygen has been removed. Because of the extremely low shrinkage attendant upon the change from the monomeric to the polymeric condition of these polyesters, objects may be molded very accurately to required dimensions. Moreover, the molded product is free from strain and flaws.

The following specific examples are intended to illustrate more fully the nature of the invention, but are not to be construed as a limitation upon the scope thereof.

Example I

To a suspension of 179 parts by weight of 2,3-dichlorohydroquinone and 241 parts of allyl chloroformate in 1000 parts of water, there was added slowly and with constant stirring a solution of about 82 parts by weight of sodium hydroxide in 200 parts of water, while the temperature of the reaction mixture was maintained at about 0 to 10° C. A voluminous precipitate formed which, after being washed with water and dried, was re-crystallized from ethyl alcohol. There were obtained about 130 parts of a white crystalline solid, melting at about 117 to 118° C., identified as 1,4-di(allylcarbonato)-2,3-dichlorobenzene.

Example II

To a solution of 101 parts by weight of 1,3-dihydroxy-4-chlorobenzene and 168.4 parts of allyl chloroformate in about 155 parts of ether, there was added slowly and with stirring a solution of 57 parts of sodium hydroxide in 100 parts of water, while the temperature of the reaction mixture was maintained at 0 to 10° C. The mixture was stirred for about two hours after the last of the sodium hydroxide solution had been added in order to insure completion of the reaction. The ether solution was washed several times with alkali and then with water. The solution was dried, and the ether removed by heating at reduced pressure. The product, 1,3-di(allylcarbonato)-4-chlorobenzene, was obtained in the form of a yellow mobile oil.

Example III

About 250 parts by weight of 4,4'-dihydroxydiphenyl sulfone was suspended in a mixture of about 500 parts of glacial acetic acid with 3200 parts of carbon tetrachloride. The temperature of the mixture was maintained at about 0 to 5° C. while about 142 parts of chlorine was bubbled in. The suspended solid material was then separated from the reaction mixture by filtration, and dried in the air. There were obtained 287 parts of 4,4'-dihydroxy-3,3'-dichlorodiphenyl sulfone melting at 169 to 173° C.

The chlorinated sulfone, together with 241 parts of allyl chloroformate, was then dissolved in about 1600 parts of acetone. To this solution there was added slowly and with constant stirring a solution of 80 parts of sodium hydroxide in 500 parts of water, while the temperature of the reaction mixture was maintained at about 0 to 10° C. The acetone layer was then separated from the aqueous layer and washed several times with an aqueous salt solution. After the solution was dried, the acetone was removed by evaporation at reduced pressure. The product, 4,4'-di(allyl-carbonato)-3,3'-dichlorodiphenyl sulfone, was obtained in the form of an oily liquid, which could not be distilled even at high temperatures and low pressures.

Example IV

To a mixture of 63.1 parts by weight of phloroglucinol and 60 parts of sodium hydroxide in 250 parts of water, there were added slowly and with constant stirring 181 parts of allyl chloroformate, while the temperature of the reaction mixture was maintained at about 0 to 20° C. The product was washed several times with water, dried, and distilled in a short-path still at 138 to 140° C. at 0.0015 mm. pressure, and was found upon analysis to be 3,5-di-(allylcarbonato)-1-hydroxybenzene.

A product consisting largely of triallyl phloroglucinol tricarbonate may be made by using a somewhat larger amount of allyl chloroformate and maintaining the temperature of the reaction mixture at 0 to 10° C. The product boils at 155 to 165° C. at 0.03 to 0.05 mm. pressure.

Example V

To a mixture of 110 parts by weight of hydroquinone with 265 parts by weight of allyl chloroformate, there was added slowly and with constant stirring a solution of 88 parts of sodium hydroxide in 200 parts of water, while maintaining the temperature of the reaction mixture at 15 to 30°. The product was separated from the reaction mixture by filtration and washed several times with water. The product, 1,4-di(allylcarbonate) benzene, after re-crystallization from ethyl alcohol, was obtained in the form of a white crystalline solid, melting at 54 to 55° C.

Example VI

To a suspension of 110 parts by weight of rescorcinol and 265 parts of allyl chloroformate in 100 parts of water, there was added slowly and with constant stirring a solution of 123 parts of potassium hydroxide in 200 parts of water, while the temperature of the reaction mixture was maintained at about 20° C. The product, which appeared in the form of a heavy oil, was separated from the reaction mixture and washed with water. The product was distilled in a short-path still at 101 to 103° C. at 0.015 to 0.02 mm. pressure. It was identified by analysis as 1,3-di(allylcarbonato) benezene.

Example VII

To a mixture of 110 parts by weight of catechol, 265 parts of allyl chloroformate, and 100 parts of water there was added slowly and with constant stirring a solution of 88 parts of sodium hydroxide in 300 parts of water while the temperature of the reaction mixture was maintained at about 10° C. The product, which appeared in the form of a heavy oil, was separated from the reaction mixture, washed with water, and distilled. It boiled at a temperature of about 133° C. at less than 0.1 mm. pressure, and was identified as 1,2-di(allylcarbonato) benzene.

Example VIII

To a mixture of 64 parts by weight of phenolphthalein with 50 parts of allyl chloroformate there was added slowly and with constant stirring a solution of 17 parts of sodium hydroxide in 35 parts of water, while the temperature of the reaction mixture was maintained at about 0 to 10° C. The product, diallyl phenolphthalein dicarbonate, after seperation from the reaction mixture and washing with water, was in the form of a heavy oil.

Example IX

To a mixture of 93 parts by weight of 2-phenylhydroquinone, 127 parts of allyl chloroformate, and 100 parts of water, there was added slowly and with constant stirring a solution of 42 parts of sodium hydroxide in 100 parts of water while the temperature of the reaction mixture was maintained at about 20° C. The product, 1,4-di(allylcarbonato) - 2 - phenylbenzene, separated from the reaction mixture in the form of a heavy oil, and after repeated washing with water, followed by drying and distilling, was ready for use as a molding resin.

Example X

To a mixture of 107 parts by weight of 4,4'-dihydroxybenzophenone, 127 parts of allyl chloroformate, and 100 parts of water there was added slowly and with constant stirring a solution of 42 parts of sodium hydroxide in 100 parts of water, while the temperature of the reaction mixture was maintained at about 10° C. The product, a white, crystalline solid, was separated from the reaction mixture by filtration and washed several times with water, after which it was recrystallized from ethyl alcohol. The material melted at 79 to 80° C. and was identified as 4,4'-di(allylcarbonato) benzophenone.

Example XI

About 125 parts by weight of 4,4'-dihydroxydiphenyl sulfone was dissolved in a solution of 42 parts of sodium hydroxide in 200 parts of water. To this solution there was added slowly and with constant stirring 127 parts of allyl chloroformate, while the temperature of the reaction mixture was maintained at about 5 to 10° C. The product, a white, solid material, was separated from the reaction mixture by filtration and washed several times with water. After recrystallization from ethyl alcohol, it appeared in the form of a white crystalline solid melting at 75 to 76° C. It was identified by analysis as 4,4'-di(allylcarbonato) diphenyl sulfone.

Example XII

To a mixture of 34 parts by weight of 2,2-bis-(4-hydroxyphenyl) propane, 37 parts of allyl chloroformate, and 40 parts of acetone, there was added slowly and with continuous stirring a solution of 13 parts of sodium hydroxide in 30 parts of water while the temperature of the reaction mixture was maintained at about 10° C. Stirring of the reaction mixture was continued while the temperature was allowed to rise to about 25° C. The mixture was then washed several times with water to remove the sodium chloride, a small amount of acetone was then added to the product, and the mixture was heated to 150° C. at less than 1 mm. pressure in order to remove all of the acetone and water. The product, 2,2-bis-(4-(allylcarbonato) phenyl) propane, was a viscous liquid having a refractive index at 20° C. of 1.5422.

Example XIII

About 139 parts by weight of 4,4'-dihydroxyoctachloro diphenyl were dissolved in a solution of 25 parts of sodium hydroxide in 250 parts of water. To this solution with constant stirring there were added 76 parts of allyl chloroformate while the temperature of the reaction mixture was maintained at about 5 to 10° C. The product, which separated as a solid material, was washed several times with water and recrystalized from ethyl alcohol. It appeared in the form of white crystals, melting at 156 to 160° C. It was identified as 4,4'-di(allylcarbonato) octachlorodiphenyl.

The monomeric esters of this invention may be polymerized by heating in the presence of any of the usual catalysts. For example, 48 parts by weight of the product of Example III was mixed with five parts of a 30% solution of diacetyl peroxide in dimethyl phthalate, and the mixture was heated for about 48 hours at 60° C. The shrinkage of the material during the polymerization was less than 4%, and the produce was a hard, transparent, solid material having a Barcol Impressor hardness of about 25.

The product of Example VI was mixed with o, o'-dichlorodibenzoyl peroxide, in the proportion of 29.86 parts of the diester to 0.52 part of the catalyst. The mixture was heated for one hour at 60° C., and for one additional hour at 100° C. to give a hard, clear, non-thermoplastic solid.

The triester of Example IV was mixed with dibenzoyl peroxide in the proportions of 22.8 parts of the triester and 0.684 part of the catalyst. The mixture was then heated for one hour at 100° C. to give a hard, clear, non-thermoplastic polymer.

Other polyesters within the scope of this invention may be polymerized by similar methods using the same or other catalysts. It is also possible to employ mixtures of two or more of these polyesters with each other in such a polymerization, as well as mixtures of these polyesters with other polymerizable unsaturated compounds, as well as with plasticizers, pigments, fillers, other polymers or resins, dyes, etc.

Because of the fact that atmospheric oxygen tends to inhibit the polymerization of these materials, it is generally desirable to carry out the polymerization in a closed vessel from which the air has been removed by evacuation or by replacement with nitrogen or other inert gas. Any air dissolved in the monomeric material may be removed prior to polymerization by placing the material in a closed vessel and reducing the pressure therein.

Although specific examples of the invention have been herein described, it is not intended to limit the invention solely thereto, but to include all of the obvious variations and modifications falling within the spirit and scope of the appended claims.

We claim:
1. 4,4'-di(allylcarbonato) diphenyl sulfone.
2. 4,4'-di(allylcarbonato)-3,3'-dichlorodiphenyl sulfone.
3. A nuclear chlorinated di-(alkenyl carbonato) diphenyl sulfone in which the alkenyl radical is one possessing from 3 to 5 carbon atoms, having at least 1 hydrogen atom attached to the connecting carbon atom and containing a methylene group attached by a double bond to a carbon atom.
4. A di-(alkenyl carbonato) diphenyl sulfone in which the alkenyl radical is one possessing from 3 to 5 carbon atoms, having at least 1 hydrogen atom attached to the connecting carbon atom and containing a methylene group attached by a double bond to a carbon atom.
5. A di-(alkenyl carbonato) benzophenone in which the alkenyl group is one possessing from 3 to 5 carbon atoms, having at least 1 hydrogen atom attached to the connecting carbon atom and containing a methylene group attached by a double bond to a carbon atom.
6. 4,4'-di-(allyl carbonato) benzophenone.
7. A di-(alkenyl carbonato) aromatic compound in which the alkenyl carbonato radicals are directly attached to aromatic carbon atoms and in which the aromatic structure consists of two benzene rings each of which rings is directly attached to a single intermediate connecting atom an oxygen atom selected from the class consisting of carbon and sulfur atoms to which connecting atom is attached by both of its valences, the alkenyl carbonato radicals having the structure

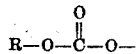

in which R is an alkenyl radical possessing from 3 to 5 carbon atoms, having at least 1 hydrogen atom attached to the connecting carbon atom and containing a methylene group attached by a double bond to a carbon atom.
8. A polymer of 4,4'-di-(allyl carbonato) diphenyl sulfone, said polymer being a hard, non-thermoplastic, resinous, solid material.
9. A polymer of 4,4'-di-(allyl carbonato)-3,3'-dichloro diphenyl sulfone, said polymer being a hard, non-thermoplastic, resinous, solid material.
10. A polymer of 4,4'-di-(allyl carbonato) benzophenone, said polymer being a hard, non-thermoplastic, resinous, solid material.
11. A polymer of a di-(alkenyl carbonato) aromatic compound as defined in claim 7, said polymer being a hard, non-thermoplastic, resinous, solid material.

JAMES A. BRALLEY.
FRANK B. POPE.

REFERENCES CITED

The following references are of record in the file of this patent:

UNITED STATES PATENTS

| Number | Name | Date |
|---|---|---|
| 2,370,567 | Muskat et al. | Feb. 27, 1945 |
| 2,370,571 | Muskat et al. | Feb. 27, 1945 |
| 2,379,250 | Muskat et al. | June 26, 1945 |
| 2,384,115 | Muskat et al. | Sept. 4, 1945 |
| 2,385,932 | Muskat et al. | Oct. 2, 1945 |

Certificate of Correction

Patent No. 2,455,653.                                                                December 7, 1948.

JAMES A. BRALLEY ET AL.

It is hereby certified that errors appear in the printed specification of the above numbered patent requiring correction as follows:

Column 2, line 46, before the word "compound" insert *aromatic*; column 6, line 64, Example V, for "30°" read *30° C.*; column 7, line 9, Example VI, for "benezene" read *benzene*; column 8, line 47, Example XIII, for "produce" read *product*; column 10, line 1, claim 7, before "selected" strike out "an oxygen atom" and insert the same in line 3, same column, after the word "atom";

and that the said Letters Patent should be read with these corrections therein that the same may conform to the record of the case in the Patent Office.

Signed and sealed this 22nd day of November, A. D. 1949.

[SEAL]

THOMAS F. MURPHY,
*Assistant Commissioner of Patents.*